April 29, 1930.  D. R. WOLFF  1,756,615
VALVE
Filed Oct. 27, 1927
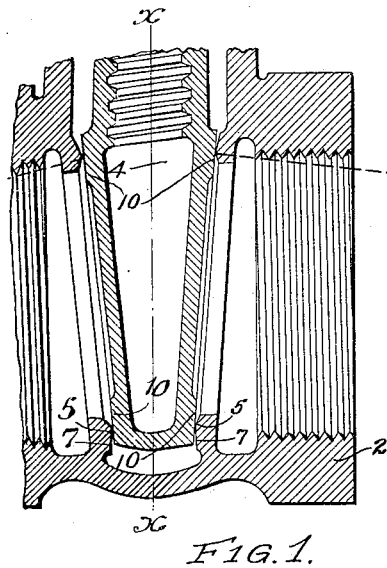
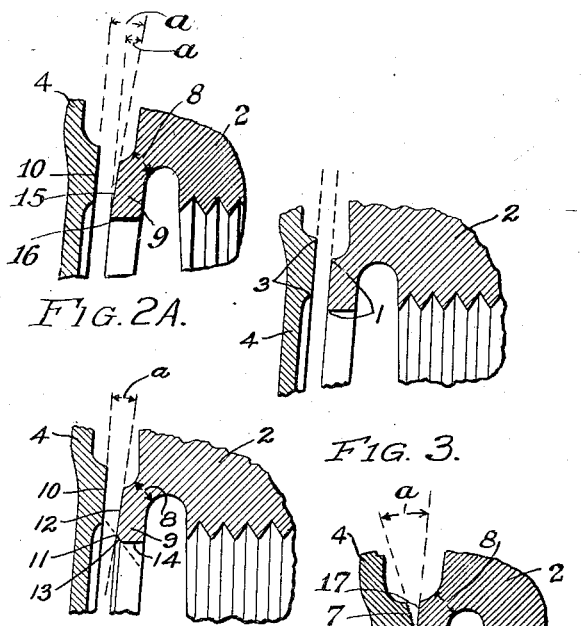
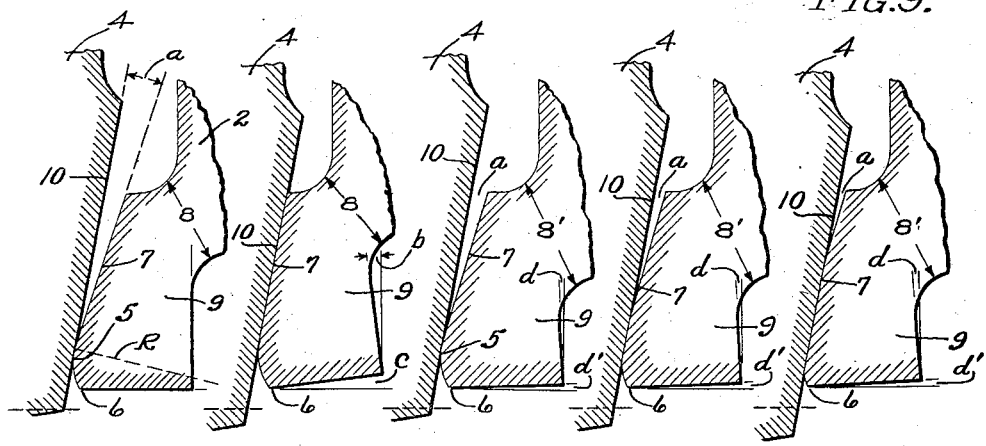
Inventor
DANIEL R. WOLFF
By
Attorney Patented Apr. 29, 1930

1,756,615

UNITED STATES PATENT OFFICE

DANIEL R. WOLFF, OF MANSFIELD, OHIO, ASSIGNOR TO THE OHIO BRASS COMPANY, OF MANSFIELD, OHIO, A CORPORATION OF NEW JERSEY

VALVE

Application filed October 27, 1927. Serial No. 229,049.

My invention relates to valves and particularly to valves of the gate type in which a gate having angularly disposed faces or seats contacts with corresponding angularly disposed seats upon the valve body.

The object of my invention is to provide seats upon the valve body and gate which will co-act with each other and produce a tight valve when in the closed position.

It is usual to make the gate with fixed faces or with relatively movable faces and machined so that all points of the face will rest in a common plane and the same is true of the seat upon the body.

Studies which I have made of such construction show that such valves are not always tight, in fact, too often they show leakage and the cause of this seems to be due to the fact that the inner and outer edges of the seat upon the body and disc are rough and uneven and may even have a burr caused by the tool used in machining the face.

A further study and investigation upon my part shows that this rough contact edge of the seat can be overcome by machining the seat on the valve body or on the gate, preferably on the valve body, such that the initial contact at least between the gate and body will be an unbroken line contact, free from any irregularities, and this can be brought about in several ways, as hereinafter disclosed.

My invention resides in the new and novel construction, combination and relation of the parts hereinafter described and shown in the drawing accompanying this specification.

Fig. 1 is a sectional view of a part of a valve of common construction on the market and well known to those skilled in the art. The figure shows only a portion of the gate and body, but shows the contact seat between the gate and body of my improved type.

Fig. 2 shows a modification of the seat on the body from that shown in Fig. 1.

Fig. 2A shows a modified form of the seat from that of Fig. 1.

Fig. 3 shows the seats as now constructed in common practice, in which the planes of the seat on the body and the gate are parallel and flat.

Figs. 4 to 8, inclusive, show schematically and in enlarged form a valve body seat of my improved type and a gate seat and shows cooperation between these seats under varying conditions.

Fig. 9 shows an arrangement whereby my improved seat is placed on the gate member of the valve.

As previously stated, valves in common use are now machined with their seats according to Fig. 3, and I find that in such cases the edges 1 on the body 2 and the edges 3 on the gate 4 are liable to be rough, not only from the machining tool, which is usually of a cross-feed type, raising a burr at the edges 1 and 3, but due to the fact that these edges are produced by a sanded core in molding the body, and are, therefore, quite rough, and to remove this burr and true up the edges 1 and 3, especially the edges 1, is quite an expensive operation.

To avoid these rough edges, which I find are quite impractical and undesirable to produce a valve which is free of leakage, I crown the face of one of the seats, preferably the seat on the body. This produces a high spot 5 extending entirely around the seat on the body, and which forms initially a line contact with the face of the seat on the gate and a contact which is complete and unbroken. This line of contact is produced by crowning the seat on the body and a crown can be produced by rounding the valve seat for a distance from the inner edge 6 of the valve body and merging the rounded portion into the flat seat portion 7, which is angularly disposed to the plane of the seat on the gate, as shown at $a$ and forms the side wall of a frustrum of a hollow cone. The rounding portion on the body seat may be formed by a tool operating across the surface of the seat and guided by means of a templet on the machine, and which will produce a short arc of a circle of the radius R. I prefer to have this curved portion adjacent the inner edge 6 of the body, thereby bringing the apex of the crown adjacent the edge 6 for the reason that I also construct the neck 8 of the body such that it will yield under the pressure of the gate in closing the valve, and by placing the crown of the seat adjacent the edge, the gate will contact with the body at a point considerably removed from the neck 8, and, therefore, offer a greater bending moment about the neck 8, causing the seat portion 9 to yield more readily under the closing action of the gate 4.

Referring to Fig. 4, it will be noted that the gate has been lowered so that it just contacts with the highest part of the seat on the body, and that a line contact will be formed between the body and gate, as shown in Fig. 1.

This line contact will be complete around the entire disc if the planes of the face of the gate seat and the plane in which the apex of the body seat resides in are parallel. If, however, they are not exactly parallel the continued movement of the gate into the valve body will tend to force the seat portion 9 away from the gate, as the neck 8 of the seat portion 9 is made yielding or elastic and the gate will not enter the valve body a great distance before the contact between the gate and valve body will be complete and unbroken, as shown in Fig. 1. Further forcing inwardly of the gate will cause the seat portions to flex about the neck 8 to a point where finally the flat portion 7 of the body seat will contact with the seat 10 of the gate. The condition where the flat portion of the body seat 7 contacts with the seat 10 of the gate, is shown in Fig. 5, and the movement of the body seat portion 9 is indicated by the angles $b$ and $c$.

If a valve body has a seat portion 9 in which the neck is sufficiently heavy to render the seat portion only slightly yielding such that the face 7 cannot be brought into contact with the face 10 of the gate 4 after the valve is closed, then the repeated seating of the gate against the seating face of the member 9 will cause the crowned surface of the seating portion 9 to be worn away, and this will be true of both the surface on the gate and on the seating portion, but the seating face on the portion 9 is subject to the wearing action to a greater degree than that on the body, as the area of contact on the portion 9 is less than that on the gate 4. This is due to the fact that the gate is movable, and, therefore, the wearing surface is distributed over a greater area than in the case of the seating face on the portion 9.

In Fig. 6 the seat of the gate is shown in contact with the seating face on the portion 9 with a pressure sufficient to have caused the neck 8' of the portion 9 to yield slightly, producing the angles $d$ and $d'$.

In Fig. 7 the same parts are shown after further operation of the gate in closing the valve, and it will be noted that the seating surface of the portion 9 has been worn so that it amounts to quite a little area with the same angular displacement at $d$ and $d'$.

In Fig. 8 the conditions are such that the increased wear between the gate and portion has been such as to bring the seating surface on the portion 9 to a very much greater amount than that shown in Fig. 7, and approaches closely to that in Fig. 5, in which the area of contact is made at the initial operation of the gate due to the neck 8 being sufficiently flexible to allow such bending, as indicated by the angles $b$ and $c$. In Fig. 8 the original crowned effect of the seat has been practically eliminated through actual wear of the metal due to the fact that the neck 8' resists yielding to a greater degree than the neck 8.

In Fig. 2 is shown a slight modification from the seats shown in Figs. 4 to 8, inclusive, in that the crowned seat is still present on the seat portion 9, but it is produced by beveling the inner edge of the seat portion, thereby producing an apex 11 as the result of the two sides of an obtuse angle. This form of seat can be made by means of a tool which is ground to proper shape and is inserted within the valve body and then brought backward against the rough face of the body, thereby finishing the entire face of the seat portion 9 in a single operation.

I have not shown the gate valve in its entirety, because such valves are common on the market and well known to those skilled in the art, and a valve of the class described may be found in various patents, as for instance, Patent 1,138,721, dated May 11, 1915, assigned to The Ohio Brass Company, which shows movable or adjustable seats on the gate. I prefer to use a gate of the rigid type but cut away to lighten the same, as shown in my drawing, and permit the adjustment to reside in the seat portion 9 due to its yieldable connection with the body, but a gate having adjustable discs, as in the patent referred to, can be used in a valve body having seats, as herein described.

It will be apparent that if the face 12 of the seat portion 9 of Fig. 2 were made to extend across the entire seating face of the seat portion 9 and the beveled portion 13 is eliminated, that the apex 11 will come at the inner edge of the seat portion 9, and this is a modification which will also produce the results brought out in connection with the other forms of seats, providing the inner edge 14 of the seat portion 9 is machined, and care is taken to remove the burr, so that the same will form an initial line of contact with the gate which will be continuous and unbroken. In that case the angle $a$, indicated on Fig. 2, will extend across the entire seating face of the seat portion 9, and if the neck portion 8 is made to yield, then the conditions set forth in connection with Figs. 4 and 5 will apply. Such a modification is shown in Fig. 2A having the face 15 and the apex 16 which is first engaged by the gate 4.

While the seats herein described have been pointed out as applied to the body member, the same contours can be applied to the seating face on the gate, in which case the seating face on the seat portion 9 would be flat, as shown in Fig. 9 and the surface 7 and apex 5 would be formed with gate seat and the seat face 17 on the body would be flat.

There will, of course, be modifications to the disclosure herein made, which will be apparent to those skilled in the art, but I wish to be limited only by my claims.

I claim—

1. The combination of a valve body, passages from the exterior to the interior thereof, angularly disposed circular body seats surrounding each passage and formed integrally with the body by a yielding neck, a seating face on each seat, a gate member having angularly disposed circular seating faces thereon to engage the seating faces on the body seats, both sets of seating faces being of limited width and one set of the seating faces having a crowned contour with the apex of the crown adjacent the inner edge of the face and each arranged to form an unbroken circular line of contact with its co-operating face when they meet and means on the gate to receive other means to move the gate, the angularity of the planes of the contacting portions in the two sets of faces coinciding.

2. A valve body having passages from the exterior to the interior thereof and each surrounded within the body by a circular seat of limited width and integrally connected to the body and a seating face formed upon one face of each seat comprising a curved portion adjacent the inner edge of the seat and merging into a flat portion to form an apex engaged by a gate when moved transversely of the passages, the flat portion adapted to be engaged by the gate as the apex wears away.

3. A valve body having a pair of spaced seats and the face of each seat having two surfaces angularly disposed to each other and forming a circular contacting portion of limited width to engage with cooperating surfaces on a gate member and each said contacting portion resting in planes angularly disposed to each other and to the said angularly disposed surfaces.

4. A gate valve comprising a body, an alined passage through the body, a pair of spaced seats surrounding the passage and integrally secured to the body by a yielding connection, the adjacent faces of the seats having an apex formed thereon and positioned in planes angularly disposed to each other and a portion of the seat face forming the side surface of a frustrum of a hollow cone, a gate movable transversely of the axis of the passage and having seating faces on opposite sides to engage the apices, the seating faces on the gate being fixed relative to each other and means on the gate to be engaged by other means to move it transversely of the axis of the passage.

5. A gate valve comprising a gate and a hollow body, a pair of alined openings in the body, seats formed integrally with the body surrounding each opening and spaced from but facing each other and each face provided with a surface shaped to form initially with spaced faces on the gate substantially a single line of contact, each line of contact forming a complete circle positioned in a plane and the planes angularly disposed to each other and parallel to the planes of the cooperating faces on the gate.

6. A gate valve comprising a hollow body and a gate member, a pair of aligned openings in the body closed by the gate member, seat members formed integrally with the body and surrounding each opening and spaced from but facing each other and each face provided with a surface shaped to form with spaced faces on the gate substantially a single line of contact, each line of contact forming a complete circle, all points of each circle being positioned in a common plane and the planes angularly disposed to each other and one of the members being yieldable relative to the other member to permit adjustment of the faces relative to each other.

In testimony whereof I affix my signature.

DANIEL R. WOLFF.